United States Patent
Yu et al.

(10) Patent No.: US 12,215,899 B1
(45) Date of Patent: Feb. 4, 2025

(54) THERMOELECTRIC DEHUMIDIFIER

(71) Applicant: US GINZZU INC, Houston, TX (US)

(72) Inventors: Yindi Yu, Shangrao (CN); Linshu Yu, Shangrao (CN)

(73) Assignee: US GINZZU INC

( * ) Notice: Subject to any disclaimer, the term of this patent is extended or adjusted under 35 U.S.C. 154(b) by 0 days.

(21) Appl. No.: 18/811,783

(22) Filed: Aug. 22, 2024

(51) Int. Cl.
| | |
|---|---|
| *F25B 21/02* | (2006.01) |
| *B01D 53/26* | (2006.01) |
| *D06F 58/24* | (2006.01) |
| *D06F 105/36* | (2020.01) |

(52) U.S. Cl.
CPC ............ *F25B 21/02* (2013.01); *B01D 53/265* (2013.01); *D06F 58/24* (2013.01); *D06F 2105/36* (2020.02); *F25B 2321/023* (2013.01); *F25B 2321/0251* (2013.01)

(58) Field of Classification Search
CPC .............. F25B 2321/0251; F25B 21/02; F25B 2321/023; B01D 53/265
See application file for complete search history.

(56) References Cited

U.S. PATENT DOCUMENTS

| | | | | |
|---|---|---|---|---|
| 4,400,948 A * | 8/1983 | Moorehead | ............. | F25B 21/02 62/3.3 |
| 6,393,842 B2 * | 5/2002 | Kim | ...................... | F24F 5/0042 62/3.4 |
| 9,555,686 B2 * | 1/2017 | Ranalli | ................... | B60H 1/034 |
| 9,857,107 B2 * | 1/2018 | Inaba | ..................... | H10N 10/17 |
| 9,989,267 B2 * | 6/2018 | Brykalski | ............. | F24F 5/0042 |
| 10,667,605 B2 * | 6/2020 | Jeon | ....................... | A47B 67/005 |
| 11,209,176 B2 * | 12/2021 | Ma | ......................... | F24F 13/222 |
| 11,993,132 B2 * | 5/2024 | Pacilli | ................ | B60H 1/00807 |
| 2010/0154437 A1 * | 6/2010 | Nepsha | .................. | F24F 5/0042 62/3.4 |
| 2016/0368458 A1 * | 12/2016 | Oh | .......................... | B60H 3/024 |
| 2018/0178621 A1 * | 6/2018 | Henkel | ................. | F24F 5/0042 |
| 2018/0259204 A1 * | 9/2018 | Jeon | ........................ | F24F 13/20 |
| 2020/0271336 A1 * | 8/2020 | Huang | ...................... | F24F 3/14 |

FOREIGN PATENT DOCUMENTS

| | | |
|---|---|---|
| CA | 2409107 A1 | 11/2001 |
| CN | 209101631 U | 7/2019 |
| JP | 2020062635 A | 4/2020 |

* cited by examiner

*Primary Examiner* — Filip Zec

(57) ABSTRACT

The invention relates to a thermoelectric dehumidifier, comprising a housing and a thermoelectric module, wherein a middle partition is arranged in the housing, a cold end of the thermoelectric module is arranged on a front face of the middle partition, and a hot end of the thermoelectric module is arranged on a back face of the middle partition; the middle partition is also provided with a windshield comprising an air inlet end and an air blowing end which are communicated, heat dissipation air from the hot end enters from the air inlet end and is blown out from the air blowing end, and the air from the air blowing end blows to a surface of a refrigeration metal plate, so that condensed water drops on the surface of the refrigeration metal plate are accelerated to slide into improve condensation efficiency.

9 Claims, 6 Drawing Sheets

THERMOELECTRIC DEHUMIDIFIER

TECHNICAL FIELD

The present invention relates to a dehumidifying device, and particularly to a dehumidifier which uses a thermoelectric effect to condense a water content.

BACKGROUND OF THE PRESENT INVENTION

A dryer can quickly dry wet clothes without direct sunlight, and is mainly used for quickly drying the clothes without a natural air drying condition, mainly comprising the steps of heating-evaporating-exhausting moisture-cooling, etc. However, an existing dryer directly exhausts moisture indoors, and the exhaust air contains a lot of water vapor to result in excessive indoor humidity, which is not conducive to health of a user, and will also lead to a damp and moldy furniture.

In view of shortcomings in the prior art, the present invention aims at providing a thermoelectric dehumidifier for reducing a water content in air exhausted from a dryer. The thermoelectric dehumidifier is connected with the dryer, and the air exhausted from the dryer is dried by the thermoelectric dehumidifier.

SUMMARY OF THE PRESENT INVENTION

The present invention provides a thermoelectric dehumidifier which solves a problem that an existing dryer in the prior art directly exhausts moisture indoors, and the exhaust air contains a lot of water vapor to result in excessive indoor humidity, which is not conducive to health of a user, and will also lead to a damp and moldy furniture.

The solution to solve the technical problem according to the present invention is as follows: a thermoelectric dehumidifier used for reducing a water content in air exhausted from a dryer comprises a housing and a thermoelectric module, wherein the housing is provided with an air inlet, and the air inlet is communicated with an air vent of the dryer; a middle partition is arranged in the housing, the thermoelectric module is installed on the middle partition, a cold end of the thermoelectric module is arranged on a front face of the middle partition, and a hot end of the thermoelectric module is arranged on a back face of the middle partition; a windshield is also arranged on the middle partition, the windshield comprises an air inlet end and an air blowing end which are communicated, the air inlet end faces the hot end of the thermoelectric module, the air blowing end faces the cold end of the thermoelectric module, and air from the air blowing end blows to a surface of a refrigeration metal plate of the thermoelectric module.

Preferably, the windshield comprises a semi-open cavity surrounded by a back plate, a top plate and two side plates, a fixing frame is arranged in a middle part of the windshield, the fixing frame divides the semi-open cavity into the air inlet end and the air blowing end, the air inlet end is communicated with the air blowing end, and a plurality of installation pins are arranged at a lower part of the fixing frame; the middle partition plate is provided with a windshield installation groove, and the plurality of installation pins are detachably inserted into the windshield installation groove.

Preferably, the thermoelectric module comprises the refrigeration metal plate, a heat insulation plate, a radiator and a fan; wherein the refrigeration metal plate is the cold end of the thermoelectric module; the radiator is the hot end of the thermoelectric module; the middle partition is also provided with a heat exchange installation groove, the thermoelectric module is placed in the heat exchange installation groove, wherein the refrigeration metal plate is located at the front face of the middle partition, and the radiator and the fan are located at the back face of the middle partition.

Preferably, the air inlet is arranged at a side of the housing, a first heat dissipation port is also opened next to the air inlet, and a second heat dissipation port is opened at the other side of the housing.

Preferably, a water tank is detachably installed at a bottom of the housing, and a water outlet is opened at a lower part of the water tank.

Preferably, a front panel is installed on a front side of the housing, and an air outlet grid is installed on the front panel; a rear panel is installed on a rear side of the housing, a central air suction port is opened in a middle part of the rear panel, and an upper heat dissipation port is opened at an upper part of the rear panel.

Preferably, the front panel is provided with a placing groove, filter cotton is installed in the placing groove, the air outlet grid is arranged outside the filter cotton, and the air outlet grid is hinged with the front panel.

Preferably, a control knob for adjusting a power of the thermoelectric module is installed at a top of the housing, and a control panel is installed on the front panel.

Preferably, an air inlet duct is installed on the air inlet, the air inlet duct is communicated with an air vent of the dryer; the plurality of first heat dissipation ports and the plurality of second heat dissipation ports are arranged, and the refrigeration metal plate is an aluminum plate.

The present invention further provides a thermoelectric dehumidifier, the thermoelectric dehumidifier comprises a housing and a thermoelectric module; a water tank is detachably installed at a bottom of the housing; a middle partition is arranged in the housing, the thermoelectric module is installed on the middle partition, a cold end of the thermoelectric module is arranged on a front face of the middle partition, and a hot end of the thermoelectric module is arranged on a back face of the middle partition; a windshield is also arranged on the middle partition, the windshield comprises an air inlet end and an air blowing end which are communicated, the air inlet end faces the hot end of the thermoelectric module, the air blowing end faces the cold end of the thermoelectric module, and air from the air blowing end blows to a surface of a refrigeration metal plate of the thermoelectric module.

The thermoelectric dehumidifier provided by the present invention has the following advantages.

1. By arranging the windshield in the housing, the windshield comprises the air inlet end and the air blowing end which are communicated, the air inlet end faces the hot end of the thermoelectric module, and the air blowing end faces the cold end of the thermoelectric module; in a process of exhausting the heat dissipation air, a small part enters the air inlet end of the windshield and is blown out from the air blowing end, and the air blowing end blows to the refrigeration metal plate. The heat dissipation air and humid hot air form thermal convection, which makes condensed water drops formed on the refrigeration metal plate accelerate to slide into the water tank. By constantly cleaning the condensed water drops, the condensation efficiency of the refrigeration metal plate is improved, and then the dehumidification efficiency is improved.

2. The front panel is provided with the placing groove for installing the filter cotton, the air outlet grid is arranged outside the filter cotton, and the air outlet grid is hinged with the front panel, so that the filter cotton can be easily replaced or cleaned by opening the air outlet grid.

The above description is only an overview of the technical solution of the present invention. In order to clearly understand the technical means of the present invention and implement according to the contents of the specification, a detailed description of the preferred embodiment of the present invention is as follows with the drawings. The detailed description of the preferred embodiments of the present invention is given in detail by the following embodiments and their drawings.

DESCRIPTION OF THE DRAWINGS

The drawings illustrated herein are used for providing a further understanding of the present invention and constitute a part of the present invention. The illustrative embodiments of the present invention and descriptions thereof are used to explain the present invention and do not constitute an undue limitation of the present invention. In the drawings.

Figure 1:
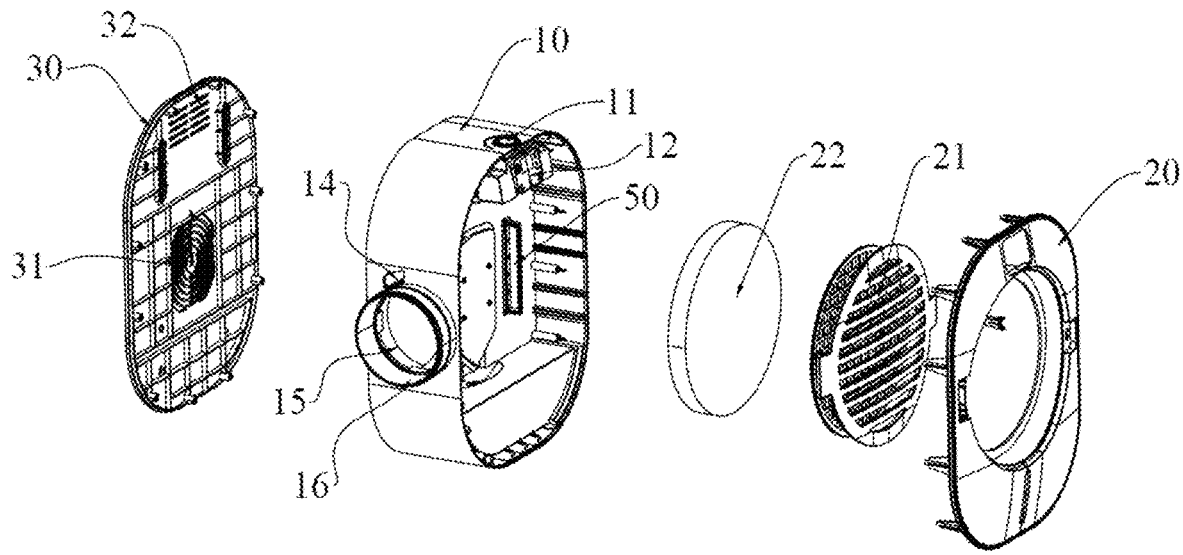
FIG. 1 is an explosion schematic diagram of a thermoelectric dehumidifier according to the present invention.

In the drawings, the list of components represented by each reference number is as follows:

10 refers to housing; 11 refers to control knob; 12 refers to control panel; 13 refers to middle partition; 14 refers to first heat dissipation port; 15 refers to air inlet; 16 refers to air inlet duct; 17 refers to windshield installation groove; 18 refers to heat exchange installation groove; and 19 refers to second heat dissipation port;

20 refers to front panel; 21 refers to air outlet grid plate; and 22 refers to filter cotton;

30 refers to rear panel; 31 refers to central air suction port; and 32 refers to upper heat dissipation port;

40 refers to thermoelectric module; 41 refers to refrigeration metal plate; 42 refers to heat insulation plate; 43 refers to radiator; 44 refers to fan; and 45 refers to circuit board;

50 refers to windshield; 51 refers to air inlet end; 52 refers to air blowing end; 53 refers to side plate; 54 refers to top plate; 55 refers to back plate; 56 refers to fixing frame; and 57 refers to installation pin; and 60 refers to water tank; and 61 refers to water outlet.

DETAILED DESCRIPTION OF PREFERRED EMBODIMENTS

The principles and features of the present invention are described below in conjunction with FIG. 1 to FIG. 12, and the examples given are only for explaining the present invention, not for limiting the scope thereof. In the following paragraphs, the present invention will be described in more detail by way of example with reference to the drawings. Advantages and features of the present invention will become more apparent according to the following description and claims. It should be noted that all the drawings are in a very simplified form and use inaccurate proportions, which are only used to facilitate and clearly illustrate the purpose of the embodiments of the present invention.

It should be noted that when a component is referred to be "fixed" to another component, the component can be directly on another component or can be the component in the middle. When one component is considered to be "connected" to another component, the component can be directly connected to another component or may be the component in the middle at the same time. When one component is considered to be "set on" another component, the component can be directly set on another component or may be the component in the middle at the same time. The terms "vertical", "horizontal", "left" and "right" and similar expressions used in the specification are for the purpose of illustration only.

Unless otherwise defined, all technical and scientific terms used herein have the same meaning as commonly understood by those skilled in the technical field of the present invention. The terms used in the specification of the present invention herein are only for the purpose of describing specific embodiments, and is not intended to limit the present invention. The terms "and/or" as used herein include any and all combinations of one or more related listed items.

Embodiment 1

A thermoelectric dehumidifier for reducing a water content in air exhausted from a dryer is provided in Embodiment 1 of the present invention, the dryer is used for drying wet clothes to make them dry; generally speaking, the air exhausted from the dryer contains a lot of water vapor, and is directly exhausted indoors to result in excessive indoor humidity, which is not conducive to the health of a user, and will lead to a damp and moldy furniture.

Figure 2:
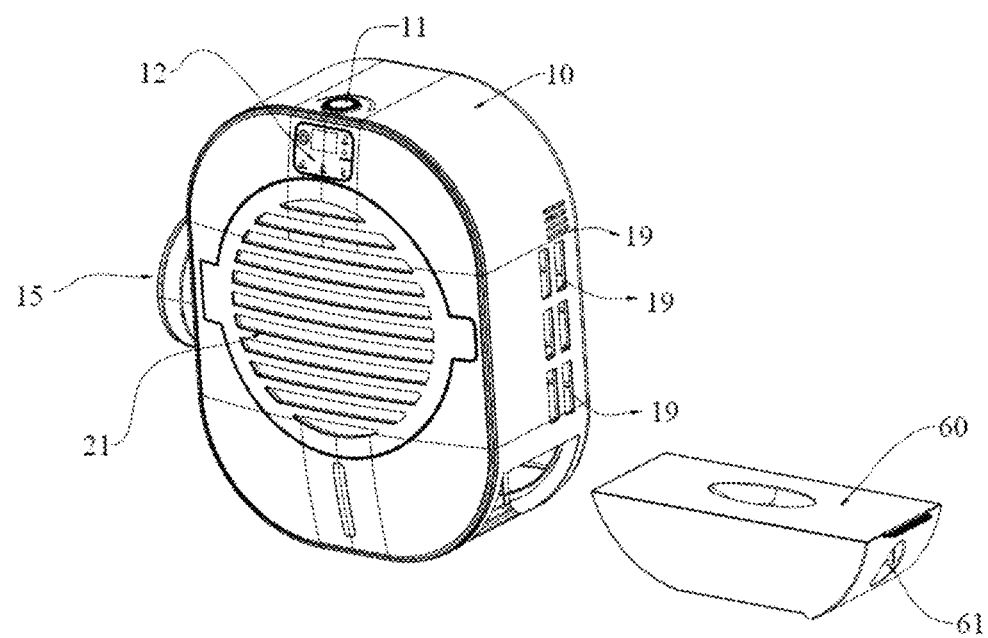
FIG. 2 is a schematic diagram of an overall structure of the thermoelectric dehumidifier according to the present invention.
Figure 3:
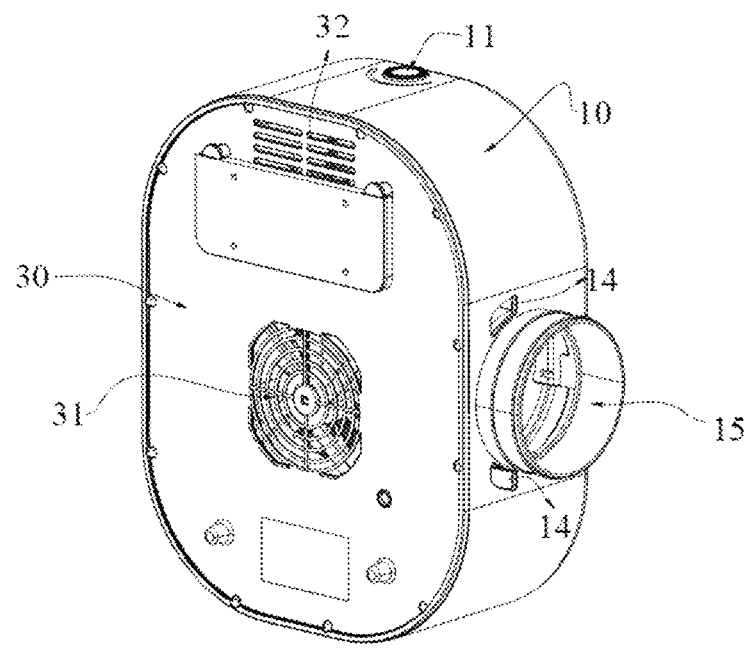
FIG. 3 is another schematic diagram of the overall structure of the thermoelectric dehumidifier according to the present invention.
Figure 4:
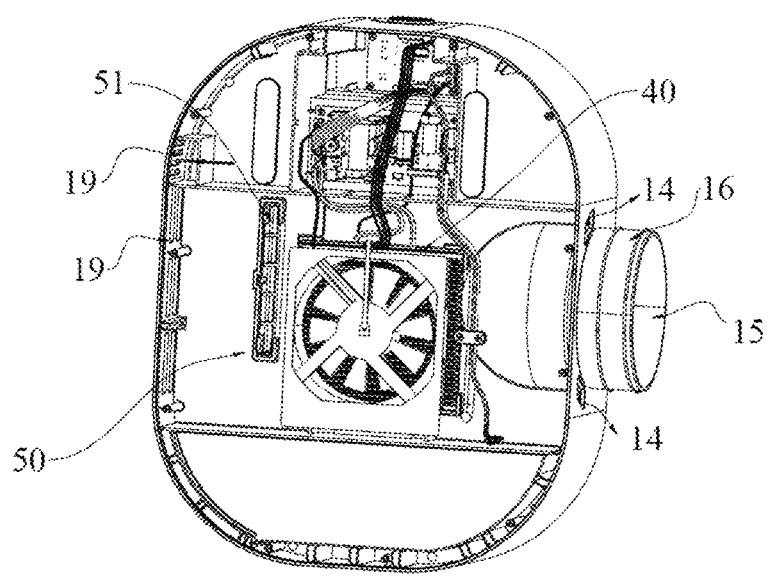
FIG. 4 is a schematic structural diagram of a rear side of the thermoelectric dehumidifier according to the present invention.

The thermoelectric dehumidifier provided in the Embodiment is used for connecting with the dryer, and the air exhausted from the dryer is dried by the thermoelectric dehumidifier; as shown in FIG. 1 to FIG. 2, the thermoelectric dehumidifier comprises a housing 10, a front panel 20 is installed at a front side of the housing 10, and a rear panel 30 is installed at a rear side of the housing 10; the housing 10, the front panel 20 and the rear panel 30 surround a cavity structure, a water tank 60 is detachably installed at a bottom of the housing 10, and a water outlet 61 is opened at a lower part of the water tank 60, which is convenient for discharging water in the water tank 60.

The housing 10 is provided with an air inlet 15, and the air inlet 15 is communicated with an air vent of the dryer. In order to facilitate connection with the dryer, an air inlet duct 16 is installed on the air inlet 15, and the air inlet is communicated with the air vent of the dryer. As shown in FIG. 3 to FIG. 8, a thermoelectric module 40 is installed in the housing 10, a middle partition 13 is arranged in the housing 10, the thermoelectric module 40 is installed on the middle partition 13, a cold end of the thermoelectric module 40 is arranged on a front face of the middle partition 13, a hot end of the thermoelectric module 40 is arranged on a back face of the middle partition 13; the middle partition plate 13 is also provided with a windshield 50, the windshield 50 comprises an air inlet end 51 and an air blowing end 52 which are communicated, the air inlet end 51 faces the hot end of the thermoelectric module 40, the air blowing end 52 faces the cold end of the thermoelectric module 40, and the air from the air blowing end 52 blows to a surface of the refrigeration metal plate 41 of the thermoelectric module 40.

Figure 9:
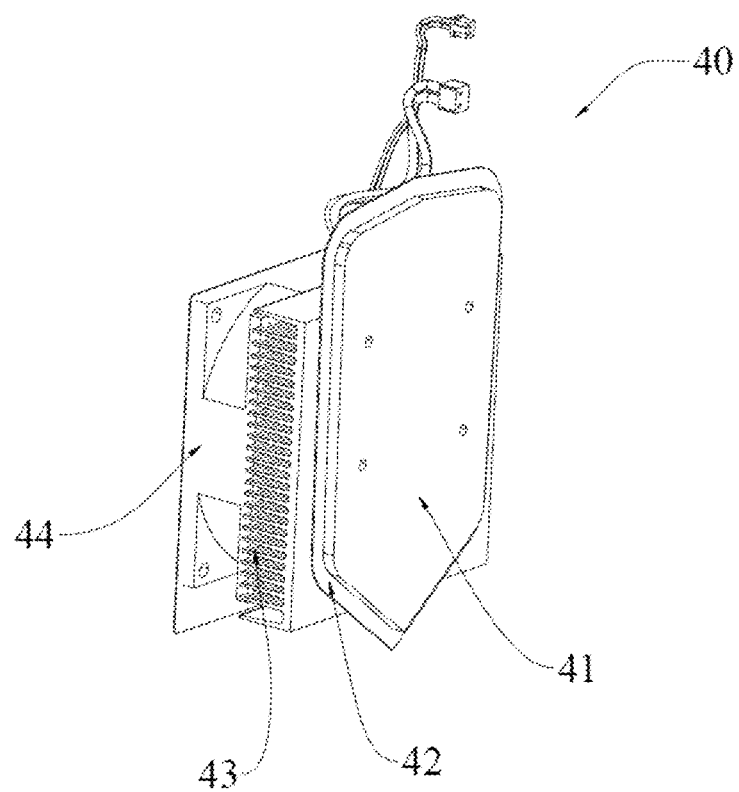
FIG. 9 is a schematic structural diagram of a thermoelectric module of the thermoelectric dehumidifier according to the present invention.

The thermoelectric module 40 creates a temperature difference between cold and hot through at least one Peltier element, the Peltier element is thermally connected to a cold side and a hot side. During the operation of the dehumidifier, water vapor in the air condenses at the cold side, thereby dehumidifying the air. As shown in FIG. 9, the thermoelectric module 40 comprises the refrigeration metal plate 41, a heat insulation plate 42, a radiator 43, a fan 44 and a circuit board 45, wherein the refrigeration metal plate 41 is the cold end of the thermoelectric module 40; the radiator 43 is the hot end of the thermoelectric module 40; the thermoelectric module 40 is internally provided with at least one Peltier element (not shown), wherein a cold side of the Peltier element is connected with the refrigeration metal plate 41, and a hot side of the Peltier element is connected with the radiator 43 and the fan 44, and the heat insulation plate 42 is arranged between the refrigeration metal plate 41 and the radiator 43. The refrigeration metal plate 41 is preferably an aluminum plate; when the humid hot air of the dryer is introduced into the air inlet 15 through the air vent, the humid hot air blows through the refrigeration metal plate 41, and at this time, the water vapor in the humid hot air is condensed by the refrigeration metal plate 41, and condensed water drops slip into the water tank 60 for collection; the radiator 43 and the fan 44 are used for accelerating the heat dissipation of the hot end, and the air in a surrounding environment is sucked into the housing 10 by the fan 44, so as to accelerate the heat exchange between the air in the surrounding environment and the radiator 43.

Figure 7:
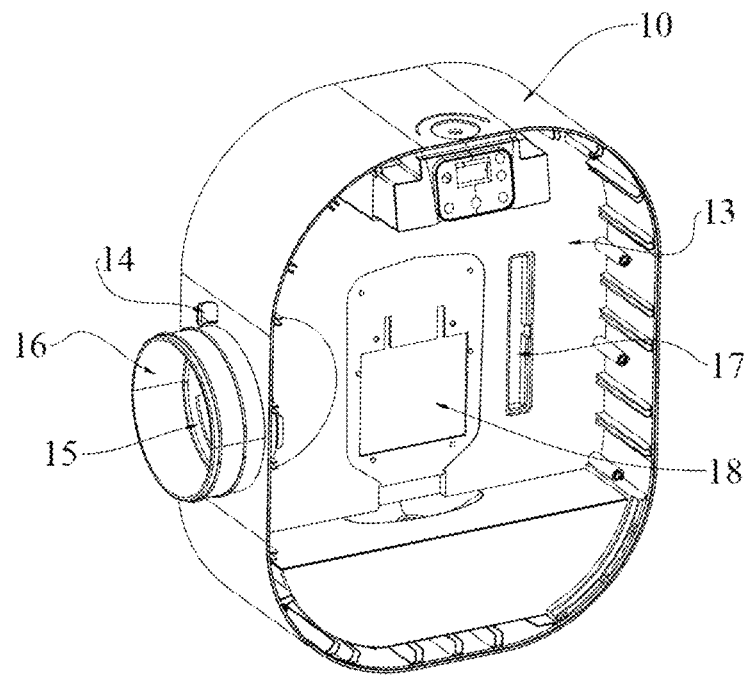
FIG. 7 is a schematic structural diagram of a housing of the thermoelectric dehumidifier according to the present invention.
Figure 8:
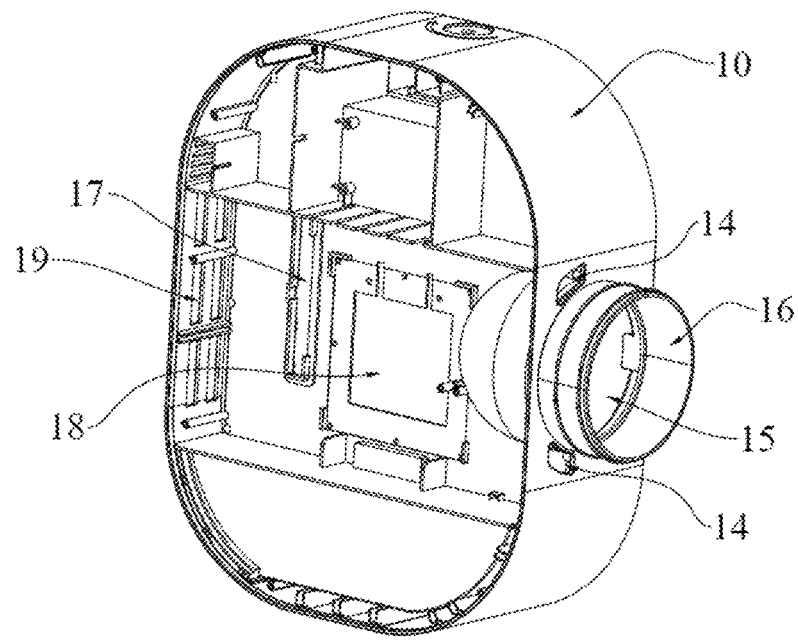
FIG. 8 is another schematic structural diagram of the housing of the thermoelectric dehumidifier according to the present invention.

As shown in FIG. 7 to FIG. 8, the middle partition 13 of the housing 10 is provided with a windshield installation groove 17 and a heat exchange installation groove 18, and the thermoelectric module 40 is placed in the heat exchange installation groove 18, wherein the refrigeration metal plate 41 is located at the front face of the middle partition 13, and the radiator 43 and the fan 44 are located at the back face of the middle partition 13; and the windshield 50 is installed in the windshield installation groove 17.

Figure 10:
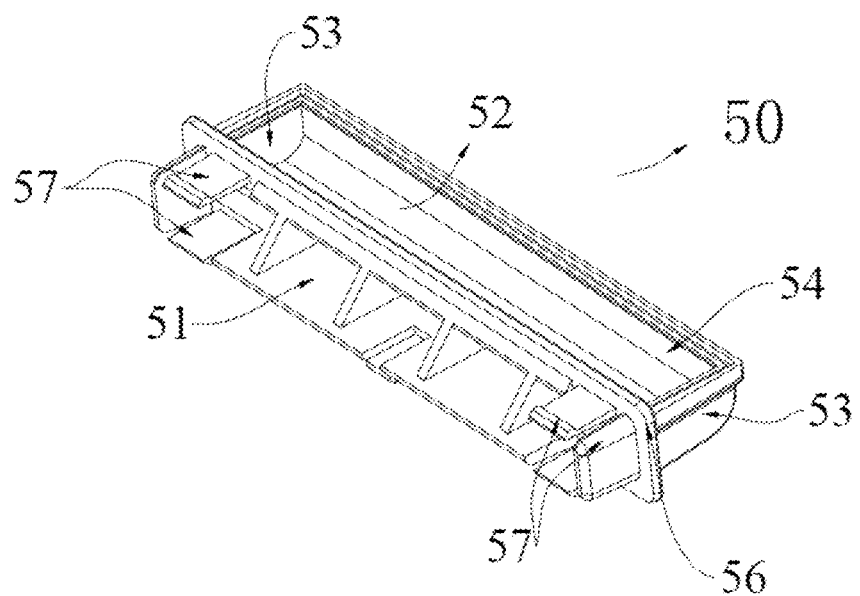
FIG. 10 is a schematic structural diagram of a windshield of the thermoelectric dehumidifier according to the present invention.
Figure 11:
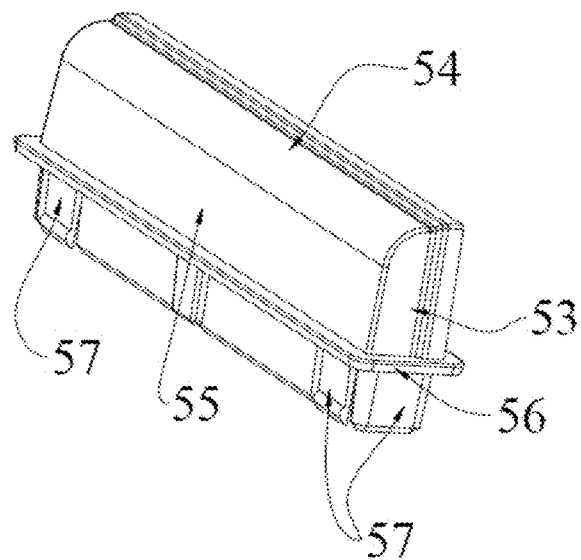
FIG. 11 is another schematic structural diagram of the windshield of the thermoelectric dehumidifier according to the present invention.

As shown in FIG. 10 to FIG. 11, the windshield 50 comprises a semi-open cavity surrounded by a back plate 55, a top plate 54 and two side plates 53, a fixing frame 56 is arranged in a middle part of the windshield 50, the windshield 50 divides the semi-open cavity into the air inlet end 51 and the air blowing end 52, the air inlet end 51 is communicated with the air blowing end 52, an opening of the air inlet end 51 faces the radiator 43 and the fan 44, and an opening of the air blowing end 52 faces the refrigeration metal plate 41; a plurality of installation pins 57 are arranged at a lower part of the fixing frame 56, which is detachably inserted into the windshield installation groove 17 through the plurality of installation pins 57, and the fixing frame 56 is in contact with the middle partition 13; and the air in the environment is sucked into the housing 10 by the fan 44 to exchange heat with the radiator 43, and then is exhausted to a surrounding area. Some heat dissipation air enters from the air inlet end 51 and is blown out from the air blowing end 52, and the air from the air blowing end 52 blows to the surface of the refrigeration metal plate 41 of the thermoelectric module 40, thus accelerating water drops on the refrigeration metal plate 41 to slide into the water tank 60, so that the refrigeration metal plate 41 can be continuously in contact with the water vapor in the humid hot air, and further improving the condensation efficiency.

As shown in FIG. 1 to FIG. 8, in order to facilitate the fan 44 to absorb environmental air and dissipate heat, the air inlet 15 is arranged at one side of the housing 10, a first heat dissipation port 14 is opened next to the air inlet 15, and a second heat dissipation port 19 is opened at the other side of the housing 10. Further, in order to improve a heat dissipation effect, the plurality of first heat dissipation ports 14 and the plurality of second heat dissipation ports 19 are provided. A central air suction port 31 is opened in a middle part of the rear panel 30, the central air suction port 31 is arranged opposite to the fan 44, and an upper heat dissipation port 32 is opened in an upper part of the rear panel 30. The air heat-exchanged with the radiator 43 is exhausted out of the housing 10 through the first heat dissipation port 14, the second heat dissipation port 19 and the upper radiator 32.

Figure 12:
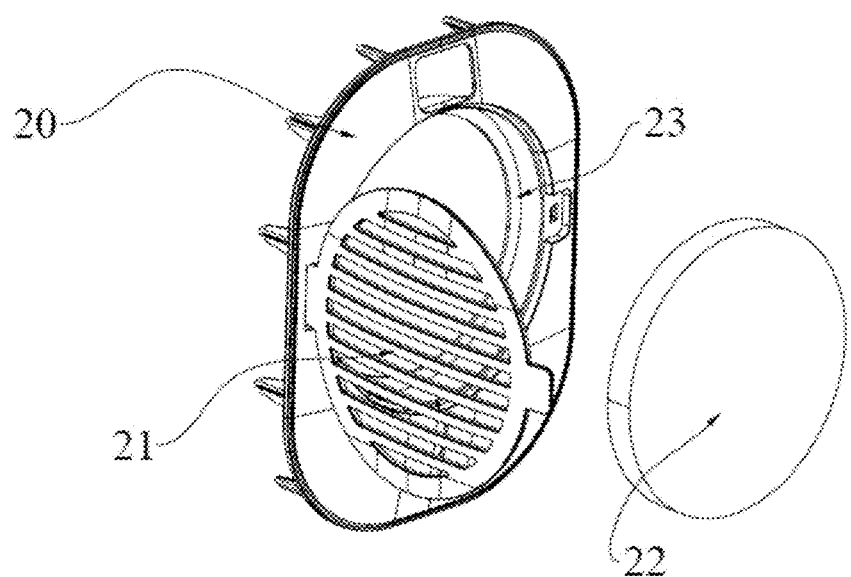
FIG. 12 is a schematic structural diagram of a front panel of the thermoelectric dehumidifier according to the present invention.

Usually, the air exhausted from the dryer contains impurities such as clothing fibers and cotton wool. If the impurities are directly exhausted indoors, it will easily lead to a lung disease after inhalation. In order to purify the impurities in the air exhausted from the dryer, as shown in FIG. 12, the front panel 20 is provided with a placing groove 23, filter cotton 22 is installed in the placing groove 23, the air outlet grid 21 is arranged outside the filter cotton, the air outlet grid 21 is hinged with the front panel 20, and the filter cotton 22 can be easily replaced or cleaned by opening the air outlet grid 21.

In order to facilitate control, a control knob 11 is installed at the top of the housing 10, the control knob 11 can be used for adjusting a power of the thermoelectric module 40 or an air volume of the fan 44. In addition, a control panel 12 is installed on the front panel 20, the control panel 12 is electrically connected with the circuit board 45, the control panel 12 comprises an on/off key, a display screen, a temperature key and a humidity key, information such as current temperature and humidity can be displayed through the display screen, and a temperature mode or a humidity mode can be switched by pressing the temperature key and the humidity key, and a target temperature value or a target humidity value can be adjusted through the control knob 11 in the temperature mode or the humidity mode. In addition, the control panel 12 is further provided with three environments, namely, humidity, comfortableness and dryness, and a user can select any of the above environments to quickly set the corresponding temperature value and the corresponding humidity value.

Figure 5:
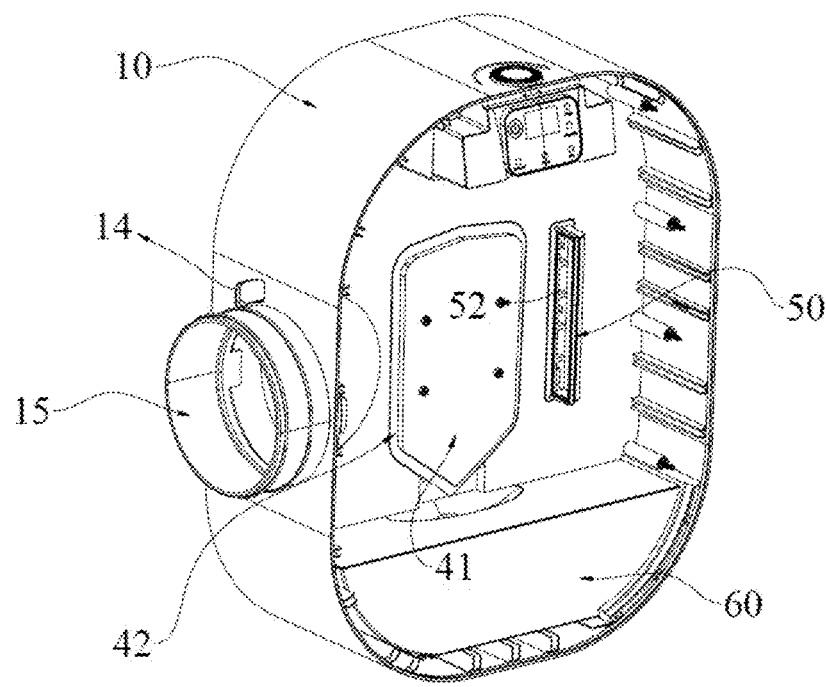
FIG. 5 is a schematic structural diagram of a front side of the thermoelectric dehumidifier according to the present invention.
Figure 6:
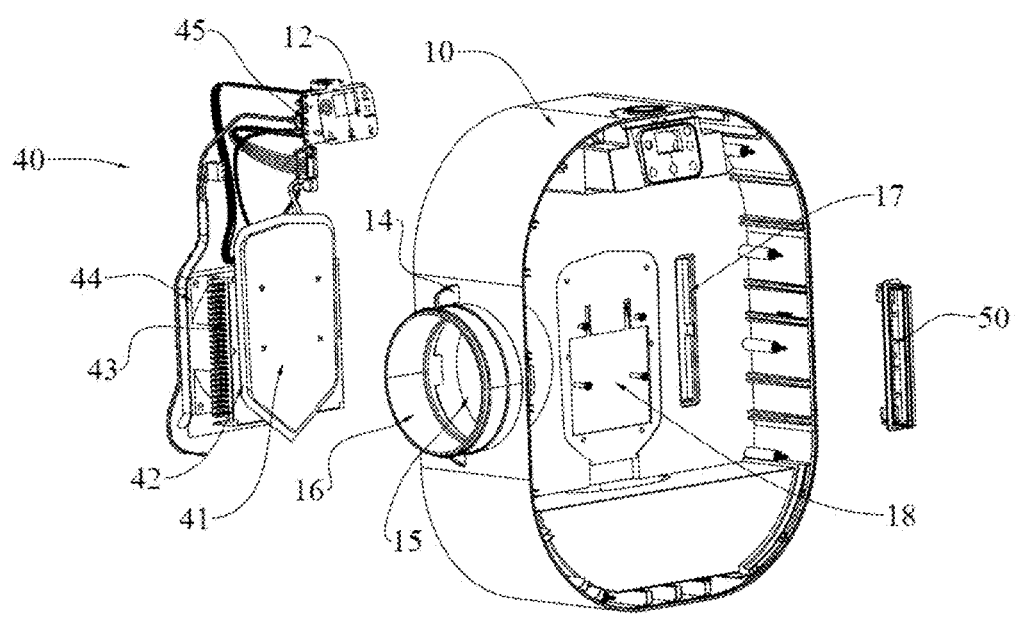
FIG. 6 is another explosion schematic diagram of the thermoelectric dehumidifier according to the present invention.

Working principle: FIG. 2 to FIG. 5 show an air flow path, the air vent of the dryer is connected with the air inlet 15, the humid hot air exhausted from the dryer enters from the air inlet 15 and blows to the refrigeration metal plate 41 (as shown in FIG. 5), the water vapor in the humid hot air is condensed by the refrigeration metal plate 41, and then the condensed water drops slide into the water tank 60; in addition, at the hot end of the thermoelectric module 40, the fan 44 sucks the relatively cold air from the surrounding environment into the housing 10 and exchanges heat with the radiator 43, and the exchanged hot air is exhausted from a plurality of heat dissipation holes, for example, from the plurality of first heat dissipation ports 14 and the plurality of second heat dissipation ports 19 at the side of the housing 10 and from the upper heat dissipation port 32 of the rear panel 30 (as shown by arrows in FIG. 2 to FIG. 5); in the process of exhausting the heat dissipation air, a small part enters through the air inlet end 51 of the windshield 50 and is blown out from the air blowing end 52, and the air blowing end 52 blows to the refrigeration metal plate 41. The heat dissipation air and the humid hot air form thermal convection, so that the condensed water drops formed on the refrigeration metal plate 41 are accelerated to slide into the water tank 60. By constantly cleaning the condensed water drops, the condensation efficiency of the refrigeration metal plate 41 is further improved, and then the dehumidification efficiency is further improved. The air exhausted from the dryer is condensed by the refrigeration metal plate 41 and then exhausted from the front panel 20, and the impurities such as fibers and cotton wool contained herein are filtered by the filter cotton 22 before being exhausted.

Embodiment 2

The thermoelectric dehumidifier provided by the Embodiment has the same structure as that of Embodiment 1. The difference from Embodiment 1 is that the thermoelectric dehumidifier provided by the Embodiment cannot be cooperated with the dryer for use, the thermoelectric dehumidifier can be used independently. The middle partition 13 is arranged in the housing 10 of the thermoelectric dehumidifier, the thermoelectric module 40 is installed on the middle partition 13, the cold end of the thermoelectric module 40 is arranged on the front face of the middle partition 13, and the hot end of the thermoelectric module 40 is arranged on the middle partition 13; the middle partition plate 13 is also provided with a the windshield 50, the windshield 50 comprises the air inlet end 51 and the air blowing end 52 which are communicated, the air inlet end 51 faces the hot end of the thermoelectric module 40, the air blowing end 52 faces the cold end of the thermoelectric module 40, and the air from the air blowing end 52 blows to the surface of the refrigeration metal plate 41 of the thermoelectric module 40.

Working principle: as shown in FIG. 2 to FIG. 5, the air in the environment is in contact with the refrigeration metal plate 41 after entering from the air inlet 15, the water vapor in the environmental air is condensed by the refrigeration metal plate 41, and the condensed water drops slide into the water tank 60; in addition, at the hot end of the thermoelectric module 40, the fan 44 sucks the (relatively cold) air from the surrounding environment into the housing 10 and exchanges heat with the radiator 43, and the exchanged air is exhausted from the plurality of heat dissipation holes, for example, from the plurality of first heat dissipation ports 14 and the plurality of second heat dissipation ports 19 at the side of the housing 10 and from the upper heat dissipation port 32 of the rear panel 30 (as shown by arrows in FIG. 2 to FIG. 5); in the process of exhausting the heat dissipation air, a small part enters through the air inlet end 51 of the windshield 50 and is blown out from the air blowing end 52, and the air blowing end 52 blows to the refrigeration metal plate 41. The heat dissipation air and the unheated environmental air form thermal convection, so that the condensed water drops formed on the refrigeration metal plate 41 are accelerated to slide into the water tank 60. By constantly cleaning the condensed water drops, the condensation efficiency of the refrigeration metal plate 41 is further improved, and then the dehumidification efficiency is further improved. The environmental air is condensed by the refrigeration metal plate 41 and then exhausted from the front panel 20, and the impurities contained herein are filtered by the filter cotton 22 before being exhausted.

It should be noted that in this specification, relational terms such as first and second are only used for distinguishing one entity or operation from another entity or operation, and do not necessarily require or imply that there is any such actual relationship or order between these entities or operations. What is not described in detail in the specification shall belong to the prior art known to those skilled in the art.

The above is only the preferred embodiment of the present invention, and does not limit the present invention in any form; any ordinary technician in the industry can smoothly implement the present invention as shown in the drawings and described above; however, any equivalent changes made by those familiar with this field by using the technical contents disclosed above without departing from the scope of the technical solution of the present invention are equivalent embodiments of the present invention; meanwhile, any equivalent changes, modifications and evolutions made to the above embodiments according to the essential technology of the present invention shall still fall within the protection scope of the technical solution of the present invention.

We claim:

1. A thermoelectric dehumidifier used for reducing a water content in air exhausted from a dryer, comprising a housing (10) and a thermoelectric module (40), wherein
  the housing (10) is provided with an air inlet (15), and the air inlet (15) is communicated with an air vent of the dryer;
  a middle partition (13) is arranged in the housing (10), the thermoelectric module (40) is installed on the middle partition (13), a cold end of the thermoelectric module (40) is arranged on a front face of the middle partition (13), and a hot end of the thermoelectric module (40) is arranged on a back face of the middle partition (13); and
  a windshield (50) is also arranged on the middle partition (13), the windshield (50) comprises an air inlet end (51) and an air blowing end (52) which are communicated, the air inlet end (51) faces the hot end of the thermoelectric module (40), the air blowing end faces the cold end of the thermoelectric module (40), and air from the air blowing end (52) blows to a surface of a refrigeration metal plate (41) of the thermoelectric module (40); and
  wherein the windshield (50) comprises a semi-open cavity surrounded by a back plate (55), a top plate (54) and two side plates (53), a fixing frame (56) is arranged in a middle part of the windshield 50 the fixing frame 56 divides the semi-open cavity into the air inlet end 51 and the air blowing end 52 the air inlet end 51 is communicated with the air blowing end 52 and a plurality of installation ins 57 are arranged at a lower art of the fixing frame (56); and the middle partition plate (13) is provided with a windshield installation groove (17), and the plurality of installation ins 57 are detachably inserted into the windshield installation groove (17).

2. The thermoelectric dehumidifier according to claim 1, wherein the thermoelectric module (40) comprises the refrigeration metal plate (41), a heat insulation plate (42), a radiator (43) and a fan (44); wherein the refrigeration metal plate (41) is the cold end of the thermoelectric module (40); and the radiator (43) is the hot end of the thermoelectric module (40);

the middle partition (13) is also provided with a heat exchange installation groove (18), the thermoelectric module (40) is placed in the heat exchange installation groove (18), wherein the refrigeration metal plate (41) is located at the front face of the middle partition (13), and the radiator (43) and the fan (44) are located at the back face of the middle partition (13).

3. The thermoelectric dehumidifier according to claim 1, wherein the air inlet (15) is arranged at a side of the housing (10), a first heat dissipation port (14) is also opened next to the air inlet (15), and a second heat dissipation port (19) is opened at the other side of the housing (10).

4. The thermoelectric dehumidifier according to claim 3, wherein a water tank (60) is detachably installed at a bottom of the housing (10), and a water outlet (61) is opened at a lower part of the water tank (60).

5. The thermoelectric dehumidifier according to claim 4, wherein a front panel (20) is installed on a front side of the housing (10), and an air outlet grid (21) is installed on the front panel (20); and a rear panel (30) is installed on a rear side of the housing (10), a central air suction port (31) is opened in a middle part of the rear panel (30), and an upper heat dissipation port (32) is opened at an upper part of the rear panel (30).

6. The thermoelectric dehumidifier according to claim 5, wherein the front panel (20) is provided with a placing groove, filter cotton (22) is installed in the placing groove, the air outlet grid (21) is arranged outside the filter cotton (22), and the air outlet grid (21) is hinged with the front panel (20).

7. The thermoelectric dehumidifier according to claim 5, wherein a control knob (11) for adjusting a power of the thermoelectric module (40) is installed at a top of the housing (10), and a control panel (12) is installed on the front panel (20).

8. The thermoelectric dehumidifier according to claim 3, wherein an air inlet duct (16) is installed on the air inlet (15), the air inlet duct (16) is communicated with an air vent of the dryer; a plurality of first heat dissipation ports (14) and a plurality of second heat dissipation ports (19) are arranged, and the refrigeration metal plate (41) is an aluminum plate.

9. A thermoelectric dehumidifier, comprising a housing (10) and a thermoelectric module (40); wherein:

a water tank (60) is detachably installed at a bottom of the housing (10);

a middle partition (13) is arranged in the housing (10), the thermoelectric module (40) is installed on the middle partition (13), a cold end of the thermoelectric module (40) is arranged on a front face of the middle partition (13), and a hot end of the thermoelectric module (40) is arranged on a back face of the middle partition (13); and a windshield (50) is also arranged on the middle partition (13), the windshield (50) comprises an air inlet end (51) and an air blowing end (52) which are communicated, the air inlet end (51) faces the hot end of the thermoelectric module (40), the air blowing end faces the cold end of the thermoelectric module (40), and air from the air blowing end (52) blows to a surface of a refrigeration metal plate (41) of the thermoelectric module (40); and wherein the windshield (50) comprises a semi-open cavity surrounded by a back plate (55), a top plate (54) and two side plates (53), a fixing frame (56) is arranged in a middle part of the windshield (50), the fixing frame (56) divides the semi-open cavity into the air inlet end (51) and the air blowing end (52), the air inlet end (51) is communicated with the air blowing end (52), and a plurality of installation pins (57) are arranged at a lower part of the fixing frame (56); and the middle partition plate (13) is provided with a windshield installation groove (17), and the plurality of installation pins (57) are detachably inserted into the windshield installation groove (17).

* * * * *